United States Patent [19]
Baker, Jr.

[11] Patent Number: 5,260,731
[45] Date of Patent: Nov. 9, 1993

[54] CAMERA MOUNT FOR A VEHICLE

[76] Inventor: Roy E. Baker, Jr., 59 Spring St., Norwalk, Ohio 44857

[21] Appl. No.: 819,810

[22] Filed: Jan. 13, 1992

[51] Int. Cl.$^5$ ............................................. G03B 29/00
[52] U.S. Cl. ..................................................... 354/81
[58] Field of Search ................ 354/81; 248/214, 231.4

[56] References Cited

U.S. PATENT DOCUMENTS

| | | | |
|---|---|---|---|
| 2,614,471 | 3/1950 | Markowitz | 354/81 |
| 3,833,196 | 9/1974 | Protzman . | |
| 4,615,597 | 10/1986 | Burriss . | |
| 5,055,864 | 10/1991 | Slikkers | 354/81 |
| 5,088,682 | 2/1992 | Gibbs | 248/231.4 |

Primary Examiner—Michael L. Gellner
Assistant Examiner—Nicholas J. Tuccillo
Attorney, Agent, or Firm—Richard C. Litman

[57] ABSTRACT

A vehicle door or window supported camera mounting bracket assembly including a pair of L shaped nesting grips having depending, cooperating, plastic coated clamp legs embracing a vehicle window top, door, door portion, or the like. An otherwise conventional camera mount is journaled through an outer end of the upper grip and a cooperating pin and slot construction together with a set screw threaded into the upper grip through the slot, formed through the lower grip, permits sliding adjustment of the grips relative to one another and thus spacing of the clamp legs, from close together (e.g., one quarter inch or less) to engage a vehicle window, to relatively far apart (e.g., two inches or more), to engage a vehicle door portion or door. The set screw is then tightened to secure the clamp legs tightly against a vehicle window or door. The upper grip has a camera support leg of sufficient length to permit mounting of a camera at the outer end of the support leg, the camera being rotatable through a full circle without interference with either the bracket or the vehicle door or window upon which the bracket is secured.

3 Claims, 2 Drawing Sheets

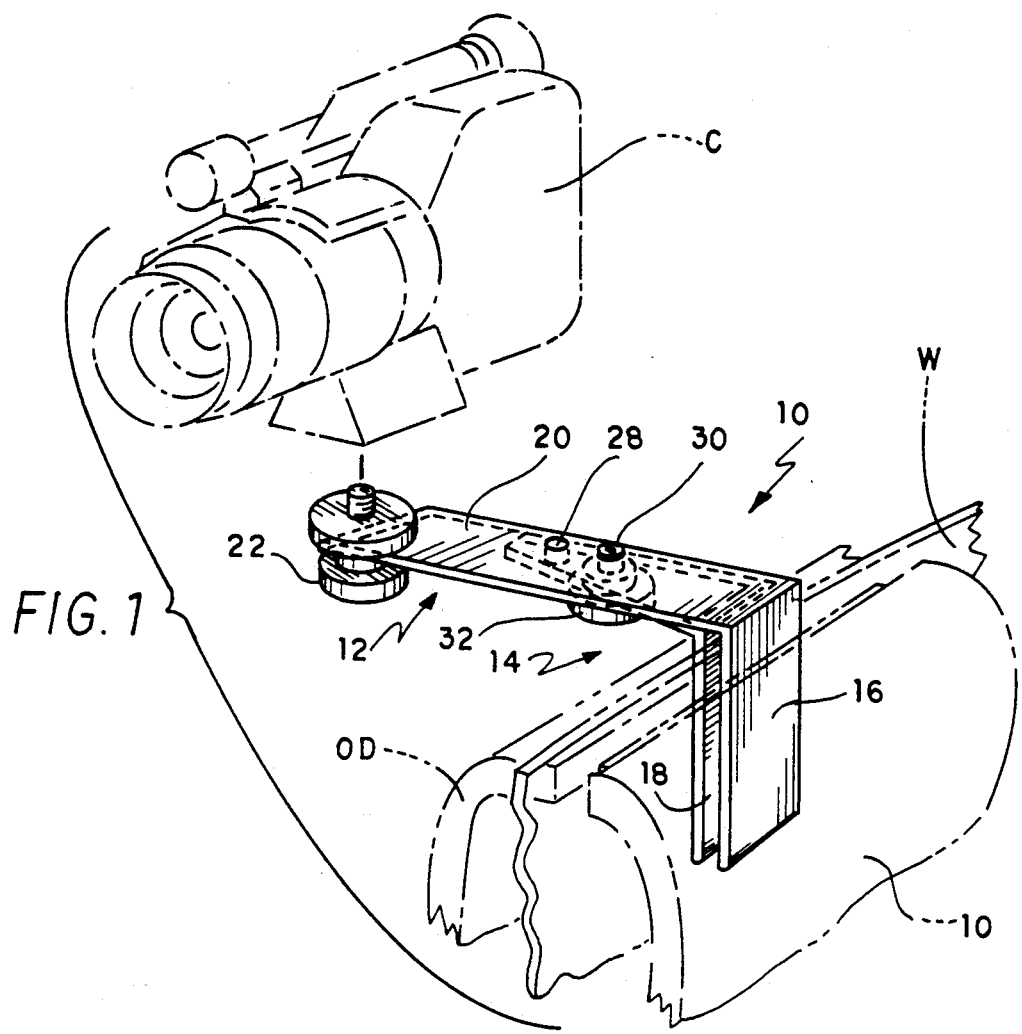
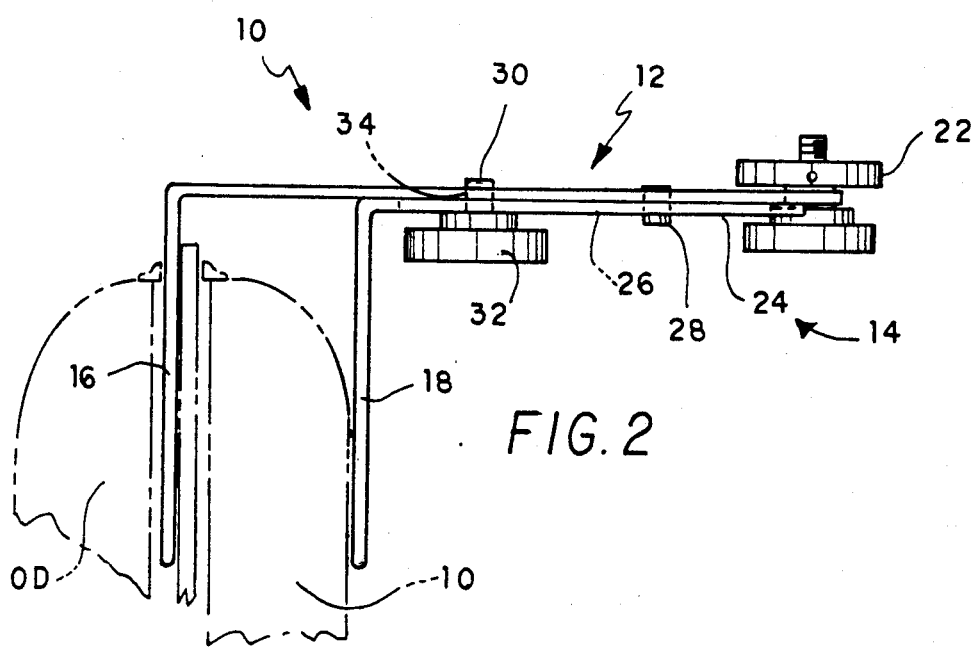

CAMERA MOUNT FOR A VEHICLE

BACKGROUND OF THE INVENTION

1. Field of the Invention

This invention relates generally to camera mounts and, more particularly, to an improved assembly for mounting a camera to a vehicle door or window.

2. Description of the Prior Art

The use of cameras—still, movie or video—from moving vehicles, has become popular and common in recent years, and different arrangements have been proposed for mounting such cameras to a vehicle. Essentially, such arrangements are of two types, both designed to help steady the camera while it is being used.

In the first type of camera mounting arrangement, the camera mount is secured to the outside of a vehicle door. Part of the conceptual theory of this kind of camera mounting arrangement is that of steadying the camera while filming or photographing people within the vehicle, or portions of the outside of the vehicle, or other nearby vehicles, people or the passing scenery.

In the second type of camera mounting arrangement, the camera mount is secured to a vehicle window. The intent here is to steady the camera while filming or photographing and allowing the camera to swivel about at least two axes.

There have been several arrangements proposed for mounting a camera to a vehicle. For example, in U.S. Pat. No. 3,833,196 issued Sep. 3, 1974 to John M. Protzman, the camera mount is designed to be attached to a vehicle window. However, the mount is rather massive and cumbersome, which not only interferes with the usual operation of the vehicle window but also may cause breakage of or damage to the vehicle window. A camera mount of considerable size and weight and designed to be attached to the outside of a vehicle door is taught in U.S. Pat. No. 4,615,597, issued Oct. 7, 1986 to John T. Burriss. The camera mount disclosed in this patent cannot be adapted or configured to be mounted on a vehicle window.

There is a need for an improved, uncomplicated and lightweight camera mounting assembly whereby a camera may be readily and optionally mounted on either the door inner or outer portions of a vehicle or on a vehicle window. The instant invention satisfies that need.

SUMMARY OF THE INVENTION

Accordingly, it is a principal object of the invention to provide an improved camera mount including adjustable grip clamps so that the mount may be secured to the inside or outside of a vehicle door or to the top of a vehicle window, as may be desired.

It is another object of the invention to provide an improved camera mount for securing a camera to a vehicle door or window as desired, so that the camera may be rotated through a full 360 degrees for filming or photographing without being limited by the mounting structure.

It is a further object of the invention to provide an improved camera mount for a vehicle including a vehicle window mounting so that, as the window is raised or lowered, the camera is raised or lowered, the mounting having minimal interference with the normal operation of the vehicle window.

With these and other objects in view which will more readily appear as the nature of the invention is better understood, the invention resides in the novel construction, combination and assembly of parts hereinafter more fully described, illustrated and claimed with reference being made to the attached drawings.

BRIEF DESCRIPTION OF THE DRAWINGS

FIG. 1 is a perspective view of the camera mount of the invention attached to the window of a vehicle, portions of the vehicle window and door and a video camera being shown in phantom lines;

FIG. 2 is a side elevational view of the camera mount of FIG. 1 but illustrating the opposite side thereof, the mount being attached to the inner portion of a vehicle door, the door being shown in phantom lines;

DETAILED DESCRIPTION OF THE PREFERRED EMBODIMENTS

Figure 3:
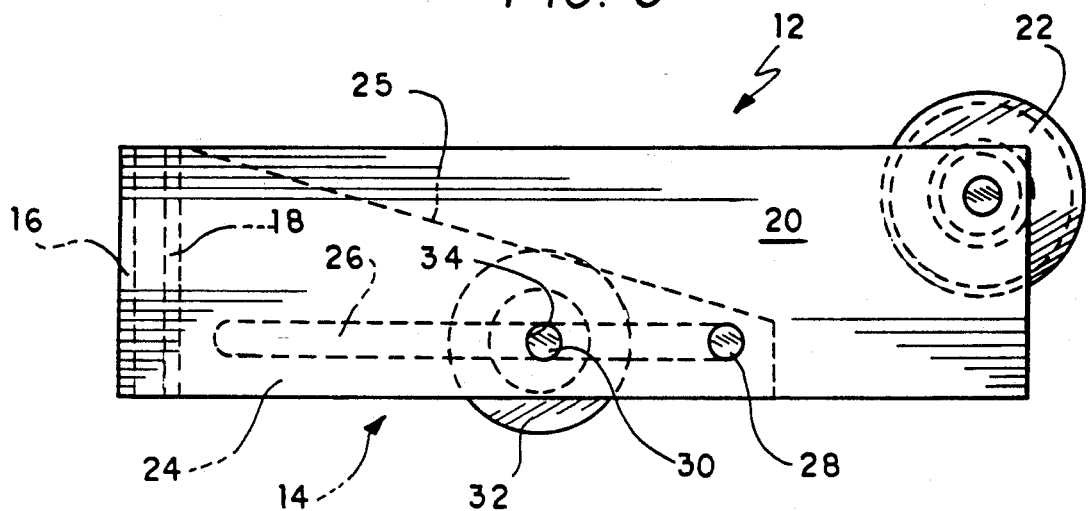
FIG. 3 is a top plan, partial sectional view of the camera mount of FIG. 2, drawn to an enlarged scale.

The camera mount 10 illustrated in FIG. 1 is a bracket assembly and includes an upper, camera support grip 12 and a lower, inside support grip 14, arranged in sliding, nesting relationship with grip 12. Each grip 12, 14 is of generally L shaped configuration and has a generally vertical support leg clamp segment 16, 18, respectively. Grips 12 and 14 may be made of metal or other suitable, strong material. The clamp segments 16, 18 are slidable toward and away from each other so that, when closely spaced apart, mount 10 may be mounted on a vehicle window W, as shown in FIG. 1. Conversely, clamp segments 16, 18 may be spread relatively wide apart to embrace the top, inner part of a vehicle door ID, as illustrated in FIG. 2. As can be further appreciated from FIGS. 1 and 2, the mount 10 as arranged in FIG. 2 could be turned about a vertical line 180 degrees and mounted over the top, outer part of a vehicle door OD so as to project outwardly from the vehicle.

As seen at the left hand portion of FIG. 1, an otherwise conventional camera C (in this case, a video camera) is mounted on the outboard end of the horizontal leg 20 of upper grip 12 by an otherwise conventional camera mounting screw 22 journaled through leg 20 as shown. Camera C, of course, includes a tripod mounting receptacle within the base thereof as is entirely conventional. The mounting screw 22 is of the type commonly provided on available camera tripods. Both construction and use of such a mounting screw 22 and the camera mounting receptacle therefor are well known to those skilled in the art.

Referring now to FIG. 3, inside grip 14 has a horizontal support leg 24 arranged in face to face contact with the undersurface of upper grip support leg 20, and is confined for sliding adjustment therealong by provision of an elongate slot 26, defined entirely through inside grip horizontal leg 24, a locating pin 28, fixed to and depending from upper grip support leg through slot 26, and a positioning and adjustment screw 30 with a finger engaged knob 32, screw 30 passing through slot 26 from underneath and threaded into a matingly threaded bore 34 in upper grip support leg 20. By loosening screw 30 by using knob 32, inside grip 14 may be adjusted back and forth with respect to grip 12, the limits of travel being defined by the slot 26 and pin 28, at one end, and by screw 30 at the other end. This permits the clamp legs 16, 18 to be spread apart, on the order of two inches or more, to accommodate a vehicle half door and window as seen in FIG. 2, or brought closely together, to only one quarter inch or less apart, to tightly clamp only a vehicle window therebetween as seen in FIG. 1. As is seen in FIG. 3, the side 25 of inside grip leg 24 facing camera mounting screw 22 is angled so as not to interfere with camera mounting screw 22 when clamp legs 16, 18 are spread far apart. Once the appropriate spacing of clamp legs 16, 18 is done, and this is easily done manually, then knob 32 is rotated to tightly clamp leg 24 against leg 20 to secure mount 10 firmly in place. This tight securing of mount 10 assures that the camera C will not vibrate with respect to the vehicle while the camera is in use.

Figure 4:
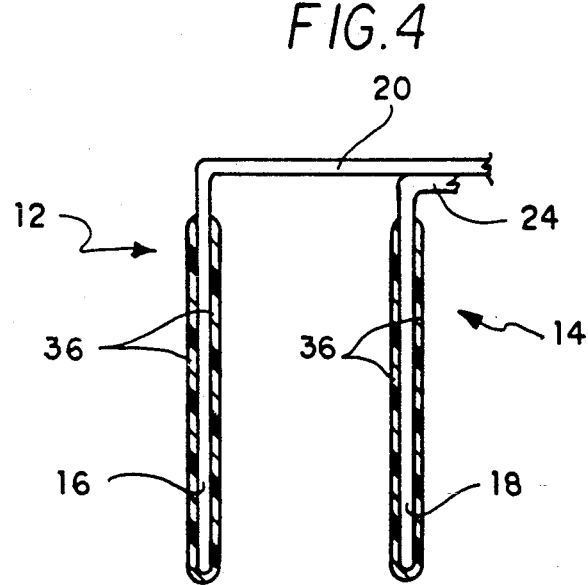
FIG. 4 is a partial elevational view of the camera mount as shown in FIG. 2, and showing another embodiment.

To reduce the possibility of marring or scratching the window W or the finish of the vehicle door on which mount 10 is secured, both clamp legs 16 and 18 may be coated with a suitable plastics material covering 36, shown in FIG. 4, as by a hot dip process or other known methods. Alternatively, the covering 36 could be a preformed jacket, stretch slipped into place or glued to legs 16, 18.

With the camera mount 10 secured to a vehicle window W as shown in FIG. 1, the level of the mounted camera C may be adjusted vertically by simply raising and lowering the window W. When the camera C is mounted internally of the vehicle, with the mount 10 arranged as shown in FIG. 2, the camera C is most easily operated from inside the vehicle. With the camera mounted outside the vehicle, as was explained above, this places the camera C for filming or taping persons and/or objects inside the vehicle. Regardless of the mounting of camera 10, in a preferred embodiment, the horizontal leg segment 20 is of an appropriate length dimension to permit camera C to be rotated through a full 360 degrees.

It is to be understood that the present invention is not limited to the embodiments described above, but encompasses any and all embodiments within the scope of the following claims.

I claim:

1. Bracket means for mounting an otherwise conventional camera on the window or door of a vehicle, comprising:

a first, generally L shaped upper grip member including a flat, extended length, horizontal, camera support leg and an integral, vertical, first clamp leg segment depending from one end thereof;

a second, generally L shaped lower grip member nested beneath said upper grip member, including a second, flat, extended length support leg and an integral, vertical, second clamp leg segment depending from an end of said lower grip member and arranged generally parallel with said first clamp leg segment;

camera support and attachment means journaled through an end of said upper grip camera support leg opposite said one end thereof, for supporting an otherwise conventional camera thereon;

cooperating pin and slot means formed in said first and second legs for slidably interengaging said first and second grips together and adjusting the distance between said first and second clamp leg segments;

a positioning and adjustment screw for locking said upper and lower grip members in assembly with said first and second clamp leg segments tightly embracing a mount for said bracket means such as a vehicle window, door or the like; and said lower grip second support leg further includes an angled, elongate edge defined thereon for avoiding an interference fit with said camera attachment means as said upper and lower grips are adjusted relative to one another;

whereby a camera may be affixed to said upper grip camera support leg with said bracket means first and second clamp leg segments securely embracing a vehicle window, door or the like.

2. The invention as claimed in claim 1 wherein both of said clamp leg segments further comprise a resilient, encompassing, plastics material protective coating.

3. The invention as claimed in claim 1 wherein said pin is rigidly affixed to and depends from said upper grip camera leg support and said slot means is formed through said lower grip second support leg, said pin means being received in said slot means, said set screw being inserted through said slot means remote from said pin means and further being matingly, threadably received in said upper grip camera leg support, thus to securely lock said grips together in adjusted assembly.

* * * * *